United States Patent [19]
Gallagher et al.

[11] Patent Number: 5,604,274
[45] Date of Patent: *Feb. 18, 1997

[54] THERMOSETTING ASPHALT HAVING CONTINUOUS PHASE POLYMER

[75] Inventors: Kevin P. Gallagher, Pataskala; Donn R. Vermilion, Newark, both of Ohio

[73] Assignee: Owens-Corning Fiberglas Technology, Inc., Summit, Ill.

[ * ] Notice: The term of this patent shall not extend beyond the expiration date of Pat. No. 5,576,363.

[21] Appl. No.: 540,102

[22] Filed: Oct. 6, 1995

Related U.S. Application Data

[63] Continuation-in-part of Ser. No. 363,154, Dec. 23, 1994, Pat. No. 5,576,363.

[51] Int. Cl.$^6$ .............................. C08L 63/00; C08L 95/00
[52] U.S. Cl. .................. 524/69; 524/59; 524/62; 524/68; 523/450; 525/54.5
[58] Field of Search ................ 524/69, 68, 62, 524/59; 523/450; 525/54.5

[56] References Cited

U.S. PATENT DOCUMENTS

| | | | |
|---|---|---|---|
| 3,505,260 | 4/1970 | Woodruff | 524/60 |
| 3,835,117 | 9/1974 | Walaschek | 524/60 |
| 3,843,576 | 10/1974 | Parkinson | 524/60 |
| 3,951,895 | 4/1976 | Anthenien | 524/60 |
| 4,176,102 | 11/1979 | Favanta | 524/60 |
| 4,393,155 | 7/1983 | Garrett | 524/60 |
| 4,499,215 | 2/1985 | Okada | 523/450 |
| 4,686,249 | 8/1987 | Diefenbach | 524/60 |
| 4,724,245 | 2/1988 | Lalanne | 524/60 |
| 4,812,493 | 3/1989 | Cummings | 524/60 |
| 4,833,184 | 5/1989 | Higgins | 524/60 |
| 4,921,892 | 5/1990 | Moore | 524/60 |
| 4,997,868 | 3/1991 | Blanpain | 524/60 |
| 5,266,615 | 11/1993 | Omels | 524/60 |
| 5,278,207 | 1/1994 | Kluttz | 524/60 |
| 5,306,750 | 4/1994 | Goodrich | 524/59 |
| 5,322,867 | 6/1994 | Kluttz | 524/60 |
| 5,331,028 | 7/1994 | Goodrich | 524/59 |
| 5,451,619 | 9/1995 | Kluttz et al. | 524/59 |

*Primary Examiner*—Paul R. Michl
*Assistant Examiner*—Olga Asinovsky
*Attorney, Agent, or Firm*—C. Michael Gegenheimer; Linda S. Evans

[57] ABSTRACT

A thermosetting asphalt product includes a blend of an asphalt and an epoxy-functionalized polymer, the epoxy-functionalized polymer being present in an amount within the range of from about 4 to about 30 percent of the combination of asphalt and epoxy-functionalized polymer, where the epoxy-functionalized polymer forms a continuous phase within the asphalt product.

20 Claims, No Drawings

THERMOSETTING ASPHALT HAVING CONTINUOUS PHASE POLYMER

CROSS-REFERENCE TO RELATED APPLICATION

This is a continuation-in-part of U.S. patent application Ser. No. 08/363,154, entitled THERMOSETTING ASPHALT, filed Dec. 23, 1994, naming Kevin P. Gallagher and Donn R. Vermilion as inventors.

TECHNICAL FIELD

This invention pertains to asphalt products, and more particularly to asphalt products which are thermosetting in nature.

BACKGROUND

Asphalt is primarily used for paving, with secondary uses being roofing products and specialty applications. Asphalt is by nature a thermoplastic material, and is relatively inexpensive compared with most other thermoplastics. Because of its thermoplastic nature, asphalt uses are limited to applications where the asphalt is not exposed to excessive heat, or where creep and distortion are not of concern. It would be advantageous if asphalt could be used in thermoset applications, such as heat-curable coatings or molding compositions.

Numerous products known in the art combine asphalt with other materials. These combinations include reinforcing asphalt with, for example glass fibers; blending other materials, such as synthetic rubber, with asphalt; and chemically modifying asphalt with such materials as polymers. Blending additives with asphalt and chemically modifying asphalts have produced many products with beneficial properties. One problem with the blending and chemical modification processes is that the desired end result properties often require significant amounts of expensive modifiers, such as synthetic polymers. It would be advantageous to be able to obtain desirable properties of modified asphalt products with a small amount of modifiers, such as 30 percent or less by weight of the combined asphalt and modifier composition.

Another problem with asphalt modifiers is that asphalt contains a wide range of chemical functionalities, so that developing a cross-linked network that does not allow one component to bleed out or separate is very difficult.

Accordingly, it would be advantageous if asphalt, a relatively inexpensive thermoplastic material could be converted into a thermosetting material, particularly if the process for converting asphalt into a thermosetting product required a minimum of expensive additive materials.

DISCLOSURE OF INVENTION

There has now been developed an asphalt product which is a thermoset material requiring no more than about 30 percent additive material by weight. This thermosetting asphalt product comprises a blend of asphalt and an epoxy-functionalized polymer in an amount within the range of from about 4 to about 30 percent of the asphalt and epoxy polymer combination, where the epoxy-functionalized polymer forms a continuous phase within the asphalt product. The epoxy-functionalized polymer reacts with reactive sites in the asphalt to form a stable, thermoset product with true thermoset characteristics, i.e., lack of flow or melting upon an increase in temperature. In addition, these materials provide improvements in cold flow, solvent resistance and toughness compared to conventional asphalt materials. Depending on the modifications made to the asphalt, the resulting thermoset properties can vary from very flexible and elastomeric to rigid. Additionally, the rate of cure can be controlled with proper modification of the asphalt.

According to this invention, there is provided a thermosetting asphalt product comprising a blend of an asphalt and an epoxy-functionalized polymer, the epoxy-functionalized polymer being present in an amount within the range of from about 4 to about 30 percent of the combination of asphalt and epoxy-functionalized polymer, where the epoxy-functionalized polymer forms a continuous phase within the asphalt product. Preferably the epoxy-functionalized polymer is present in an amount within the range of from about 6 to about 20 percent, and most preferably between 10 and 20 percent. The thermosetting asphalt does not flow or melt upon the application of heat, and in fact has no softening point below the decomposition temperature of the thermosetting product.

In a specific embodiment of the invention, the epoxy-functionalized polymer is a copolymer containing glycidyl methacrylate. Preferably, the copolymer contains one or more vinyl monomers, most preferably from the group comprising ethylene, propylene, vinyl acetate, and n-butyl acrylate.

In a specific embodiment of the invention, the blend of asphalt and epoxy-functionalized polymer is mixed with a second asphalt which is chemically modified by incorporating one or more of the group comprising amines, anhydrides, alcohols, carboxylic acids and thiols. In a preferred embodiment of the invention, the second asphalt is chemically modified by incorporating maleic anhydride in an amount within the range of from about 0.25 to about 15 weight percent of the second asphalt. More preferably, the maleic anhydride is in an amount within the range of from about 5 to about 10 weight percent.

In a specific embodiment of the invention, the blend of asphalt and epoxy-functionalized polymer is present in an amount within the range of from about 80 to about 95 percent of the thermosetting asphalt product, and the chemically modified asphalt is present in an amount within the range of from about 5 to about 20 percent of the thermosetting asphalt product.

In yet another embodiment of the invention, the blend of asphalt and epoxy-functionalized polymer is mixed with a second asphalt which is an air blown asphalt.

According to this invention, there is also provided a method of making a thermosetting asphalt product comprising blending an epoxy-functionalized polymer with an asphalt, the epoxy-functionalized polymer being present in an amount within the range of from about 4 to about 30 weight percent of the combination of asphalt and epoxy-functionalized polymer.

In a specific embodiment of the invention, the method comprises mixing a) a blend of an epoxy-functionalized polymer blended into asphalt; and, b) a second asphalt chemically modified by incorporating one or more of the group comprising amines, anhydrides, alcohols, carboxylic acids and thiols. The second asphalt can be air blown prior to mixing it with the blend of epoxy-functionalized polymer and asphalt.

BEST MODE FOR CARRYING OUT THE INVENTION

Unless otherwise specified, all percentages expressed in this specification are in terms of weight percent, and are exclusive of any filler or reinforcement material. The thermoset asphalt product and method of the invention can be made with any bituminous material such as tars, pitches or asphalts. The asphalt can be any natural or petroleum derived asphalt, including straight run fractionation-derived asphalt, cracked asphalts, asphalts derived from processing such as air blowing, propane deasphalting, steam deasphalting, chemically modifying and the like. Preferred asphalts include propane washed asphalt with melt points ranging from 125° to 200° F., roofer's flux, and road grade asphalt cements ranging from AC-2 to AC-50. The asphalt selected depends on the end properties desired. A soft asphalt will result in a soft product. A hard asphalt will result in a stiff, hard product.

The epoxy-functionalized polymers suitable for use with this invention have reactive sites in the form of epoxy side groups which can react to the functional groups on the asphalt to form covalent bonds characteristic of thermosetting products. Appropriate epoxy-functionalized polymers include copolymers having two or more monomers. Preferably, the copolymer contains glycidyl methacrylate in an amount within the range of from about 1 to about 20 percent by weight of the epoxy-functionalized polymer. The glycidyl methacrylate acts to create reactive side groups or functionalities which can graft into reactive sites in the asphalt and crosslink to form a three-dimensional network. The preferred concentration depends on the desired end use properties. Low concentrations give softer and more flexible products than higher concentrations.

The copolymer preferably contains one or more vinyl monomers, examples of which include ethylene, propylene, vinyl acetate, and n-butyl acrylate. A preferred epoxy-functionalized polymer is ELVALOY® AM polymer from dupont, which consists of ethylene, n-butylacrylate, and glycidyl methacrylate. U.S. Pat. No. 5,306,750 issued Apr. 26, 1994 and assigned to dupont indicates that such polymers may contain ethylene in the range from about 65 to about 75 weight percent, n-butylacrylate in the range from about 24 to about 34 weight percent, and glycidyl methacrylate in the range from about 5 to about 8 percent. Another epoxy- functionalized polymer containing glycidyl methacrylate, and suitable for making a thermoset asphalt is Igetabond® from Sumitomo Chemical Co., Ltd. Other epoxy-functionalized materials, such as epoxidized soy bean oil or grafted copolymers can also be used. The epoxy-functionalized polymer is blended into the asphalt by any suitable means, such as by mixing with a mixer. A high shear mixer is not required, but will shorten mix time, which will extend pot life. As used in this specification, the word "blend" means to mix. It is to be understood that the materials being blended or mixed may undergo a minor amount of reaction. The mixing will be enhanced if the temperature of the asphalt and the polymer are at least 250° F., and preferably at least 320° F. Mixing should preferably take place for at least 30 minutes.

The amount of epoxy-functionalized polymer employed varies with the desired properties of the thermoset product, within the range of from about 4 to about 30 percent of the combination of asphalt and epoxy-functionalized polymer. Preferably the epoxy-functionalized polymer is present in an amount within the range of from about 6 to about 20 percent.

EXAMPLE I

Three formulations of propane washed asphalt were prepared. The asphalt was a propane-washed asphalt from Shell Petroleum at Deerpark, Tex., having a softening point of 169° F. The asphalt was heated to 390° F. Sample 1 contained no epoxy-functionalized polymer additive. Samples 2 and 3 had 5 percent and 20 percent, respectively, by weight Elvaloy polymer, with the polymer being mixed for 30 minutes at temperatures ranging from 350° F. to 440° F. All three samples were baked overnight at 400° F. All three samples were then placed on a hot plate set at a moderately high temperature, estimated to be about 450° F. Sample 1 started to deform and flow after a few minutes. Sample 2 began to soften and started to flow a little bit. Sample 3 did not deform or flow at all. The hot plate was then turned to its highest setting, estimated to be about 550° F. After a few minutes the asphalt in Sample I was completely melted, Sample 2 was melted half-way with the remainder of Sample 2 appearing to have a gel-like consistency, and Sample 3 was still undeformed.

It has been found that the reaction or crosslinking of the reactive sites of the epoxy-functionalized polymer with the reactive sites of the asphalt can be greatly enhanced by introducing a second, chemically modified asphalt. The chemical modification of the second asphalt greatly increases the number of reactive sites capable of crosslinking with the polymer. Chemical modification of asphalt is well known. Preferably, the asphalt is chemically modified by incorporating one or more of the group comprising amines, anhydrides, alcohols, carboxylic acids and thiols.

Chemical modification has the effect of dramatically shortening cure times. Also, chemical modification of the asphalt can greatly lower the cure temperature, in some cases to the extent that the thermoset asphalt formulation will cure at room temperature. It has been found that by adding only a relatively small portion of chemically modified asphalt to a previously mixed blend of asphalt and an epoxy-functionalized polymer, the cure time and the cure temperature of the resulting thermoset product will be greatly reduced.

An example of asphalt modification to effect cure time is the Diels Alder reaction of asphalt and maleic anhydride. A typical reaction involves reacting the asphalt with maleic anhydride at a temperature of 150° C. for 2 hours. The amount of maleic anhydride that is useful is an amount within the range of from about 0.25 to about 15 percent by weight of the combined asphalt and maleic anhydride, and preferably an amount within the range of from about 5 to about 10 percent. The anhydride modified asphalt can be further reacted with amines to produce amine functionalized asphalt which will promote room temperature cure with the epoxy- functionalized polymer.

A convenient way to deal with the fast curing compositions is to prepare a two part formulation. One component or Part A contains the crosslinkable polymer blended into asphalt, such as roofer's flux, road grade asphalt, or propane deasphalted asphalt, with the softer roofer's flux and road grade asphalt being preferred. The second component or Part B contains the anhydride or amine functionalized asphalt where the choice of asphalt can be the same or different from Part A. Propane deasphalted asphalt is preferred for this second asphalt. The amount of Part B used with Part A can vary, but usually a smaller amount of Part B is sufficient. The modified asphalt of Part B acts like a catalyst for the blend of the first asphalt and the epoxy-functionalized polymer.

EXAMPLE II

Part A of a two part thermoset asphalt system was created by blending 15 percent by weight Elvaloy polymer with Amoco flux having a softening point of 90° F. The mixing occurred at 400° F. for 30 minutes. Part B was made by reacting (chemically modifying) asphalt with 10 percent by weight maleic anhydride. The asphalt was a propane washed asphalt from Shell Petroleum at Deerpark Tex., having a softening point of 169° F. The maleic anhydride and Shell propane washed asphalt were blended together at 300° F. for 6 hours to form Part B. 100 g. of Part A was mixed with 50 g. of part B and poured into a mold. It was cured for 15 minutes at 400° F. after which the material was thermoset and found not to melt prior to degradation at temperatures in excess of 550° F.

In order to find a possible lower limit on the amount of epoxy-functionalized polymer needed, the following sample was prepared.

EXAMPLE III

Part A of a two part mixture was created by blending 5 percent by weight Elvaloy polymer with the propane washed asphalt of Example II. Part B was made by reacting 5 percent by weight maleic anhydride with the same propane washed asphalt. 27 grams of Part A was mixed with 24 grams of Part B for 10 minutes at 392° F. Then the mixture was baked at 400° F for 30 minutes. Although the resulting product had some gel tendencies, it was not an effective thermoset product.

Various fillers or reinforcements can be incorporated into the thermoset asphalt products of the invention. Fillers include talc, limestone, wollastonite, glass fibers, microspheres, reclaim rubber or other materials suitable for extending the thermoset asphalt products of the invention. The addition of fillers can also provide the thermoset asphalt product with additional properties, such as fire retardancy. The thermoset asphalt products of the invention can also have reinforcements, such as mats of glass fibers, incorporated in them. Fillers and reinforcements may also include other polymeric or organic materials, such as recycled SMC, mixed or reacted into the thermoset asphalt. Preferred amounts of filler are up to about 70 percent by weight of the total weight.

EXAMPLE IV 371 g. of NYAD® 200 wollastonite filler was added to 200 g. of the propane washed asphalt of Example II and blended at 400° F. for 30 minutes. 35.3 g. of Elvaloy polymer was added to the mix and blended for an additional 30 minutes. The mixture was poured into a mold and cured at 400° F. for 2 hours. The mixture contained the polymer in an amount of approximately 15 percent by weight of the organic materials. A rigid thermoset material was produced. It did not melt prior to degradation at temperatures in excess of 550° F.

The curing times for the thermoset asphalts of the invention varies with the reactivity of the materials and with the temperature and duration of application of heat. The materials can be made so reactive that curing can occur at ambient temperatures.

EXAMPLE V

The following is an example of a thermoset asphalt cured at room temperature. Two percent maleic anhydride was reacted with Shell propane deasphalted asphalt at 300° F. for 6 hours and designated as the PDA/MAN reaction product. The PDA/MAN reaction product was dissolved in toluene and added slowly into a mixture of toluene and pentaethylenehexamine (PEHA) at 230° F. (with reflux) and the resulting reaction product was designated PDA/MAN/PEHA. 12.1 g. of the PDA/MAN/PEHA reaction product was mixed with 43 g of toluene with low heat and designated as component A. A blend of Shell PDA and Elvaloy AM was prepared containing 15 percent Elvaloy AM by weight. 24.2 g of the Shell PDA/Elvaloy AM ($^{85}/_{15}$) blend was dissolved in toluene with low heat and designated component B. Components A and B were mixed by hand at ambient temperature. The material was placed under vacuum (25 mm $H_2O$) for 8 hours to remove most of the solvent. After air drying for two weeks, the resulting material did not melt on a hot plate when heated to 550° F. The final composition was as follows:

| PDA/MAN/PEHA | 33% |
|---|---|
| Shell PDA | 57% |
| Elvaloy AM | 10% |

Other epoxy-functionalized materials can also be used in making the thermoset asphalts of the invention. EPON 1031 polymer from Shell was tried unsuccessfully and DER 331 polymer from Dow was also unsuccessful. However, Igetabond® E from Sumitomo Chemical Co., Ltd. was successful.

EXAMPLE VI

Igetabond E was added to Shell propane deasphalted asphalt (PDA) in the ratio of 1:5 at 320° F. and mixed for 30 minutes with a paddle mixer. Chemically modified asphalt (PDA/MAN ($^{90}/_{10}$)), made as in Example II, was added to the mix and mixing was continued for 60 seconds. The blended material was placed in an oven at 400° F. for 30 minutes. The resulting product was a hard and stiff material at room temperature that did not melt when heated on a hot plate to 550° F. The final composition was as follows:

| Shell PDA | 75% |
|---|---|
| Igetabond E | 15% |
| PDA/MAN (90/10) | 10% |

Product uses for the thermoset asphalt include low cost heat curable resin for molded parts or coatings. Also, the thermosetting product of the invention can be emulsified or dissolved in a solvent for cold applied coatings. Further, the blend of the first asphalt and epoxy-functionalized polymer can be used with the chemically modified asphalt to form a two part adhesive that will exhibit covalent bonding at the interface. The product of the invention can be used in any asphalt application where no cold flow or melting is desired, particularly in the areas of adhesives, sealants, coatings and vibration damping. Flow rates of the thermosetting asphalt compositions of the invention are very low, even at high temperatures. Flow rates are measured using ASTM D-1191, but at a temperature of 400° F. Preferably, the thermosetting asphalt of the invention has a flow of less than 5 mm at 400° F. as measured by ASTM D-1191, modified for testing at 400° F.

The thermosetting asphalt of the invention can be given a higher fire retardancy by using aluminum trihydrate as a filler.

EXAMPLE VII

A thermosetting asphalt was prepared by mixing Shell AC-20 at 350° F. with enough Elvaloy to make Part A about 13.5 percent polymer. Aluminum trihydrate filler was added to make up 40 percent by weight of the eventual product. To this was added a modified asphalt (PDA/MAN) to make up 10 percent of the organic composition, with the modified asphalt containing 10 percent maleic anhydride and 90 percent of the propane washed asphalt of Example II. The resulting composition was as follows:

| 40% filler | Aluminum Trihydrate | 40% |
| 60% organic | 15% Elvaloy | 9% |
| | 10% Modified asphalt | 6% |
| | 75% Propane washed | 45% |
| total | | 100% |

The aluminum trihydrate had a particle size of about one micron. After curing at 400° F. for 30 minutes, the resulting product was not resistant to a Bunsen burner flame and sustained a flame for about 45 seconds. The material charred, with no dripping.

EXAMPLE VIII

A sample similar to that in Example VII was prepared, but using 60 percent by weight filler, as follows:

| 60% filler | Aluminum Trihydrate | 60% |
| 40% organic | 15% Elvaloy | 6% |
| | 10% Modified asphalt | 4% |
| | 75% Shell AC-10 | 30% |
| total | | 100% |

The Shell AC-10 and the Elvaloy were blended with a paddle blade mixer at 400° F. for 30 minutes. This blend was cut with toluene as the mix cooled to obtain a liquid solution at ambient temperature. The aluminum trihydrate was added along with some additional toluene. This mixture was designated Part A Powdered modified asphalt PDA/MAN ($^{90}/_{10}$) was cut with toluene until a liquid solution was obtained. Aluminum trihydrate was added to the mixture, and this was Part B. Parts A and B were mixed and sprayed with a paint sprayer as a thin coating (about 10 g/ft$^2$) on a fiberglass duct board. The coating was cured by placing it in a heated press for 30 minutes at 400° F. This coating resulted in a flame spread rating of 25.6 in the ASTM E-84 tunnel test. Compared with the material of Example VII, the material of Example VIII did not drip or sustain a flame in the Bunsen burner test of Example VII.

EXAMPLE IX

A vibration damping thermoset asphalt was comprised of the following constituents:

| Shell AC-10 asphalt | 45% |
| Shell propane washed asphalt | 15% |
| Elvaloy AM | 7.5% |
| Propane washed asphalt/maleic anhydride (90/10) | 7.5% |
| Calcium carbonate filler | 25% |

The first two asphalts were mixed at 350° F. with a paddle blade mixer. The Elvaloy was added and mixed for 10 minutes. The preheated calcium carbonate was added and mixed for 10 minutes. The maleic anhydride modified asphalt was added and mixed for 60 seconds. This mixture was poured onto dried silicone release paper and pressed in a heated press to the desired thickness at 400° F. for 30 minutes. The resulting material had vibration damping properties comparing favorably with more expensive damping materials such as acrylic polymers. The higher use temperature and improved resistance to creep makes these materials attractive for this application.

The three variables found to have the most significant influence on cure time are the reaction temperature, the concentration of maleic anhydride-modified asphalt (Part B), and the concentration of the epoxy-functionalized polymer in Part A. Cure times for thermoset asphalt formulations having only Part A, i.e., only asphalt and epoxy-functionalized polymer, tended to be two orders of magnitude longer than the cure times of the formulations having Part B as well as Part A.

EXAMPLE X

Photographs of three different blends of asphalt and epoxy-functionalized polymers were taken while under a transmission light microscope to assess whether or not the epoxy-functionalized polymer formed a continuous phase. The three compositions are described in Example V, and were made by blending 70 percent by weight Amoco flux (softening point 90° F.) with 30 percent of the following three epoxy-functionalized materials: Elvaloy® polymer, Epon® 1031 resin from Shell, and DER® 331 resin from Dow. After examining the photographs magnified 40 times, it appeared that the Elvaloy polymer exhibited a continuous phase within the asphalt, and that the Epon and DER resins did not. As discussed in Example V, the product with the Elvaloy polymer demonstrated thermosetting properties whereas the other two products did not.

It will be evident from the foregoing that various modifications can be made to this invention. Such, however, are considered as being within the scope of the invention.

INDUSTRIAL APPLICABILITY

The invention can be useful in low cost heat curable resin for molded parts or coatings.

We claim:

1. A thermosetting asphalt product comprising a mixture of:

a. a blend of an asphalt and an epoxy-functionalized polymer; and, b. a second asphalt which is chemically modified by the incorporation of one or more members selected from the group consisting of amines, anhydrides, alcohols, carboxylic acids, and thiols, where the blend of asphalt and epoxy-functionalized polymer is present in an amount within the range of from about 80 to about 95 weight percent of the thermosetting asphalt product, and the chemically modified asphalt is present in an amount within the range of from about 5 to about 20 weight percent of the thermosetting asphalt product, and the epoxy-functionalized polymer forms a continuous phase within the asphalt product.

2. The thermosetting asphalt product of claim 1 in which the epoxy-functionalized polymer is present in an amount within the range of from about 6 to about 20 percent of the combination of asphalt and epoxy-functionalized polymer.

3. The thermosetting asphalt product of claim 1 having no softening point below its decomposition temperature.

4. The thermosetting asphalt product of claim 1 having a flow of less than 5 mm at 400° F. as measured by ASTM D-1191 modified for testing at 400° F.

5. The thermosetting asphalt product of claim 2 having a flow of less than 5 mm at 400° F. as measured by ASTM D-1191 modified for testing at 400° F.

6. The thermosetting asphalt product of claim 1 in which the epoxy-functionalized polymer is a copolymer containing glycidyl methacrylate.

7. The thermosetting asphalt product of claim 6 in which the copolymer contains one or more vinyl monomers.

8. The thermosetting asphalt product of claim 7 in which the copolymer contains one or more vinyl monomers from the group comprising ethylene, propylene, vinyl acetate, and n-butyl acrylate.

9. The thermosetting asphalt product of claim 8 in which the copolymer comprises:

a. ethylene in the range from about 65 to about 75 weight percent b. n-butylacrylate in the range from about 24 to about 34 weight percent c. glycidyl methacrylate in the range from about 5 to about 8 weight percent.

10. The thermosetting asphalt product of claim 1 in which the second asphalt is chemically modified by reacting it with maleic anhydride in an amount within the range of from about 0.25 to about 15 weight percent of the second asphalt.

11. The thermosetting asphalt product of claim 1 in which the second asphalt is chemically modified by reacting it with maleic anhydride in an amount within the range of from about 5 to about 10 weight percent of the second asphalt.

12. The thermosetting asphalt product of claim 1 in which the second asphalt is an air blown asphalt.

13. The thermosetting asphalt product of claim 1 further comprising filler in an amount up to about 70 percent by weight of the total weight.

14. The thermosetting asphalt product of claim 13 in which the filler is aluminum trihydrate.

15. The thermo setting asphalt product of claim 1 in which the epoxy-functionalized polymer is present in an amount within the range of from about 4 to about 30 weight percent of the blend of asphalt and epoxy-functionalized polymer.

16. A method of making a thermosetting asphalt product comprising:

(a) blending an asphalt with an epoxy-functionalized polymer to form a blend; and (b) mixing the blend with a second asphalt which is chemically modified by the incorporation of one or more members selected from the group consisting of amines, anhydrides, alcohols, carboxylic acids, and thiols, where the blend of asphalt and epoxy-functionalized polymer is present in an amount within the range of from about 80 to about 95 weight percent of the thermosetting asphalt product and the chemically modified asphalt is present in an amount within the range of from about 5 to about 20 weight percent of the thermosetting asphalt product, and the epoxy-functionalized polymer forms a continuous phase within the asphalt product.

17. The method of claim 16 in which the epoxy-functionalized polymer is present in an amount within the range of from about 6 to about 20 weight percent of the combination of asphalt and epoxy-functionalized polymer.

18. The method of claim 16 comprising air blowing the second asphalt prior to mixing the second asphalt with the blend of epoxy-functionalized polymer and asphalt.

19. The method of claim 16 in which the second asphalt is chemically reacted with an anhydride to form the chemically modified second asphalt, and the chemically modified second asphalt is subsequently modified by reacting it with an amine to produce an amine functionalized asphalt.

20. The method of claim 16 in which the epoxy-functionalized polymer is present in an amount within the range of from about 4 to about 30 weight percent of the blend of asphalt and epoxy-functionalized polymer.

* * * * *

UNITED STATES PATENT AND TRADEMARK OFFICE
CERTIFICATE OF CORRECTION

PATENT NO. : 5,604,274
DATED : February 18, 1997
INVENTOR(S) : Gallagher et al.

It is certified that error appears in the above-indentified patent and that said Letters Patent is hereby corrected as shown below:

In column 10, line 22 (line 3 of claim 17), change "combination" to --blend--.

Signed and Sealed this

Tenth Day of June, 1997

Attest:

BRUCE LEHMAN

Attesting Officer

Commissioner of Patents and Trademarks